Aug. 14, 1956  A. O. STORE  2,759,148
METHOD AND APPARATUS FOR MEASURING MOISTURE
CONTENTS OF MATERIALS
Filed Aug. 30, 1950  3 Sheets-Sheet 1
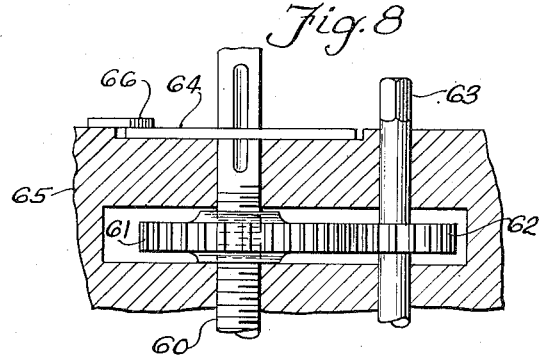
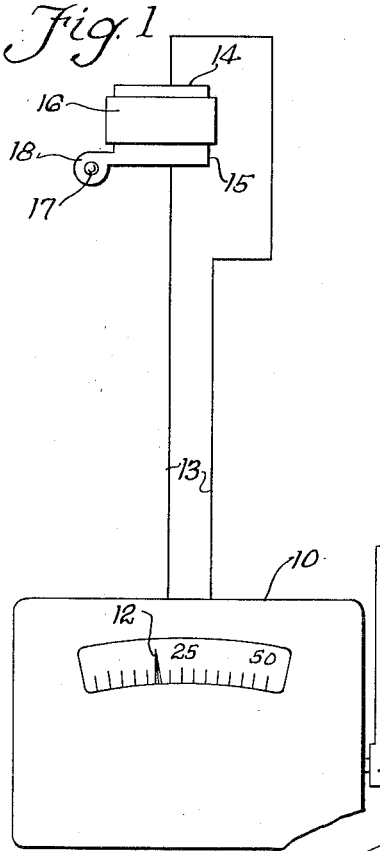
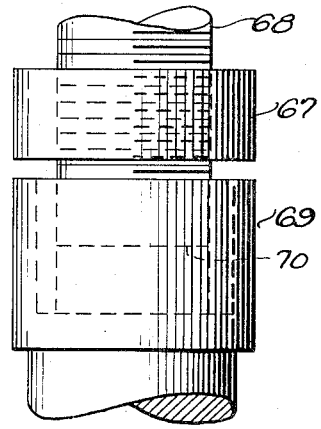
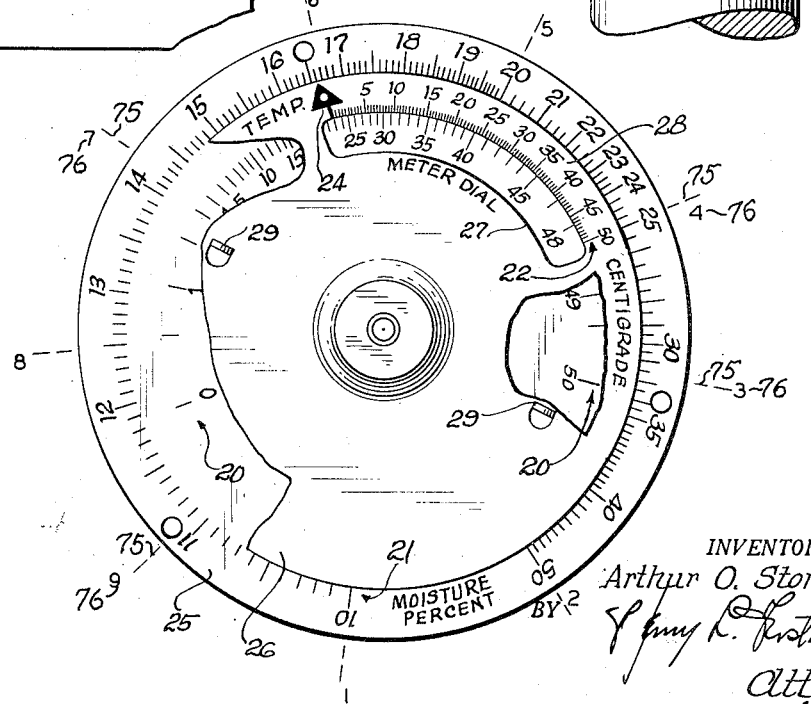
INVENTOR.
Arthur O. Store
BY
Atty Aug. 14, 1956  A. O. STORE  2,759,148
METHOD AND APPARATUS FOR MEASURING MOISTURE
CONTENTS OF MATERIALS
Filed Aug. 30, 1950  3 Sheets-Sheet 2
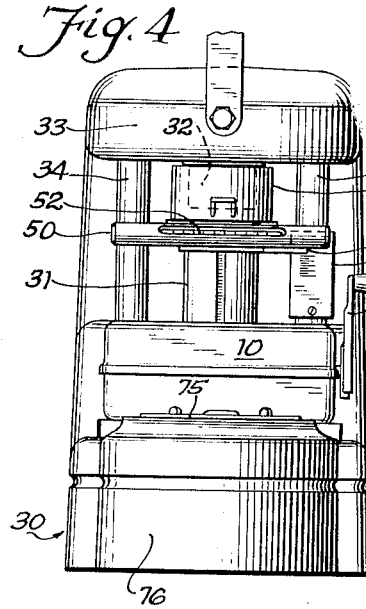
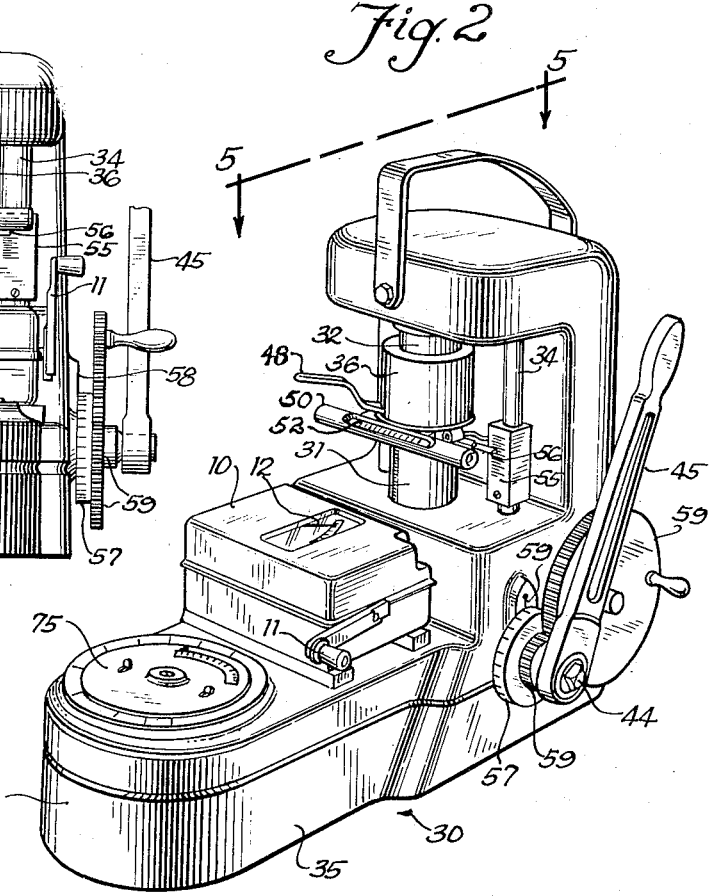
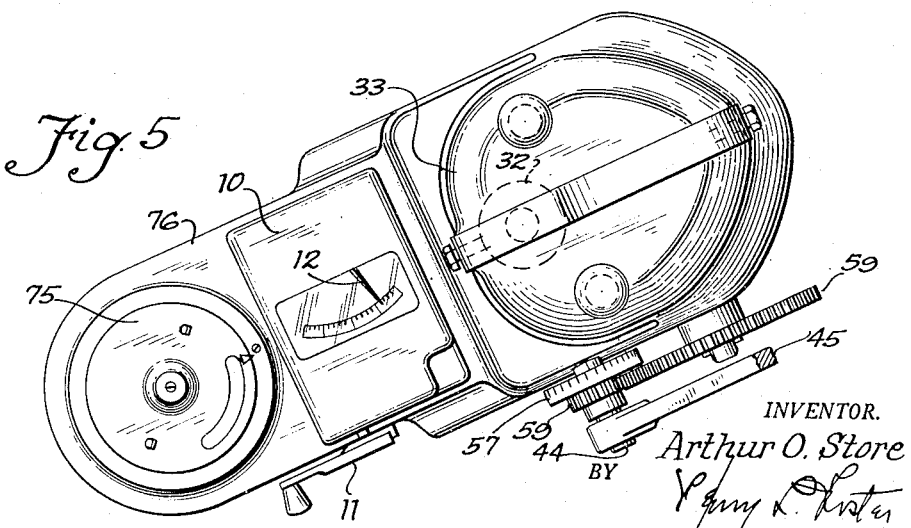
INVENTOR.
Arthur O. Store
BY
Atty Aug. 14, 1956  A. O. STORE  2,759,148
METHOD AND APPARATUS FOR MEASURING MOISTURE
CONTENTS OF MATERIALS
Filed Aug. 30, 1950  3 Sheets-Sheet 3

INVENTOR.
Arthur O. Store
BY
Atty

United States Patent Office 2,759,148
Patented Aug. 14, 1956

2,759,148

METHOD AND APPARATUS FOR MEASURING MOISTURE CONTENTS OF MATERIALS

Arthur Oscar Store, Regina, Saskatchewan, Canada, assignor to Universal Moisture Testers, Ltd.

Application August 30, 1950, Serial No. 182,287

13 Claims. (Cl. 324—65)

The present invention relates to the art of measuring moisture content of a material by measurement of electrical resistivity of such material, and, more specifically, to the art of ascertaining the moisture content percentage of a particular lot, batch or body of material by simultaneous measurement of the temperature and resistance of a sample of the material that has been subjected to a standardizing procedure that depends on the particular material and that is hereinafter disclosed. The standardizing procedure causes the measured temperature and resistance of such sample to correspond to a particular moisture percentage value according to a characteristic relation between temperature, resistivity and moisture content percentage that is common to an enormous class of materials.

Reference is made to my prior United States Patent No. 2,082,364, dated June 1, 1937, wherein are disclosed a method and apparatus for moisture content measurement. The method and apparatus herein disclosed constitute marked advances over those disclosed by the patent in method of ascertaining moisture content percentage and in technique and apparatus for using such method.

In the past, methods and apparatus have been designed and used for ascertaining moisture content by measurement of resistivity and temperature of the material, but such methods and apparatus leave much to be desired. In general, the prior art technique of such moisture content ascertainment has involved the calibration of a resistivity measuring instrument in terms of moisture content percentages at a pre-selected, definite temperature, measuring the temperature of the material just prior to testing it with the resistivity measuring instrument, and using magnitude of variance between the actual material temperature and the instrument calibration temperature as a guide to selection of a value of a temperature variance compensating factor from a table of such factors. In this prior type of technique, moisture content measurement can be made with reasonable accuracy only in a material temperature range of the order of a few degrees of variance from the instrument calibration temperature. A very important advantage of the present invention is that moisture content measurement can be made in the full range of temperatures between the freezing and boiling temperatures of the water content of material undergoing test, and the limits of this range is extended in certain cases by alteration of boiling and freezing temperatures occasioned by high pressure to which the material is subjected while being tested.

The invention is based on the concept of so standardizing samples of material to be tested, by selection of the physically controllable resistance-determining factors of such samples, namely, lengths and cross sectional areas of electrical paths that they provide, and in the case of particulate materials the degree of sample body compression, that the resistance value of such samples is determined by their moisture contents and temperatures. Additionally, the invention is based on the discovery that by properly selected standardizing procedures applied to different materials the resistance values of such materials can be made to correspond to a single characteristic relation between specific resistance values, specific temperatures and specific moisture percentage values. This procedure is applicable to an enormous class of materials the resistivity of which is determined by moisture content alone, or by moisture content and a regular content of other resistivity-affecting material such as electrolytics, since such materials have a common characteristic relation between variations in moisture contents, temperatures and resistivities.

Ascertainment of moisture content percentage by this resistance and temperature measurement of standardized samples may be applied to materials of many physical forms, as solids, liquids, pastes, and particulate materials such as bodies of granules, powders, etc. In the case of non-particulate materials the sizing of a sample to form an electrical path of preselected cross sectional area and length is usually sufficient standardization. In the case of particulate materials the best procedure at present known to me is to compress a preselected weight of the material as accurately as is practical to a preselected thickness while confining such material to a preselected cross section extended transverse to the direction of compression. The material need not be ground or otherwise altered from its natural condition. This technique of compressing material in its natural form to a preselected thickness presents a marked advance over the technique of subjecting ground material to preselected pressure, disclosed by my above-noted patent, partially because of avoiding disturbance effects on moisture content by the grinding recommended by that patent, but also, and most importantly, because compression of a given weight of material to a body of given dimensions provides a much more accurate regulation of the physically controllable factors that determine the resistance of such body than does compression by a controlled pressure.

The accurate standardization of samples permits correlation of scales respectively calibrated in specific resistance, temperature and moisture content percentage values for use in interpreting in terms of moisture content percentage the simultaneously made readings of resistance and temperature of such a sample. One important aspect of the invention relates to a device comprising an arrangement of such calibrated scales in a relation that permits this interpretation of temperature and resistance readings without computation and so simply that it can be accomplished by unskilled and non-technical personnel.

A primary object of the invention is the provision of a novel method of ascertaining percentage of moisture content by measurement of electrical resistance of a sample having dimensions and a physical condition both preselected to relate its resistance value to a particular percentage of moisture content.

Another very important object is the provision of a novel method, and apparatus for performing it, capable of accurately ascertaining the moisture content of materials in a very wide range of material temperatures.

Another object is the provision of a novel device comprising correlated scales respectively calibrated in terms of resistance, temperature and moisture percentage values for interpreting in terms of moisture content percentage simultaneously made readings of temperature and resistance of such physically standardized samples.

Still another object is the provision of a novel combination and arrangement of an instrument for simultaneously measuring resistances and temperatures of standardized samples of material.

Still another object is the provision of a novel arrangement for ascertaining temperature of a sample of material while it is held under pressure in a compression chamber for electrical resistance measurement.

An additional object is the provision of a novel combination with a device arranged to compress a confined sample body of material accurately to a preselected thickness, of an electrical resistance measuring instrument, and an arrangement for measuring temperature of a compressed sample of material undergoing resistance measurement.

Another object is the provision of a novel, compact and portable moisture content measuring instrument for field use, the accuracy of which compares favorably with results obtained by laboratory techniques and apparatus the results of which at present are regarded as standards of moisture content measurement.

In the accompanying drawings:

Fig. 1 is a schematic diagram of a system arranged for ascertaining moisture content of standardized samples of materials in accordance with the invention.

Fig. 2 is a perspective view of an instrument arranged in accordance with the invention.

Fig. 3 is a broken top plan of a set of scales calibrated and relatively arranged in accordance with the invention for interpreting, in terms of moisture content percentages, simultaneously made readings of resistances and temperatures of standardized samples of materials.

Fig. 4 is a front elevation of the instrument shown in Fig. 1.

Fig. 5 is a top plan thereof.

Figs. 8 and 9 are fragmentary detail views of alternative actuating mechanisms that may be used in instruments of the kind shown by Figs. 4 to 7.

Figure 6:
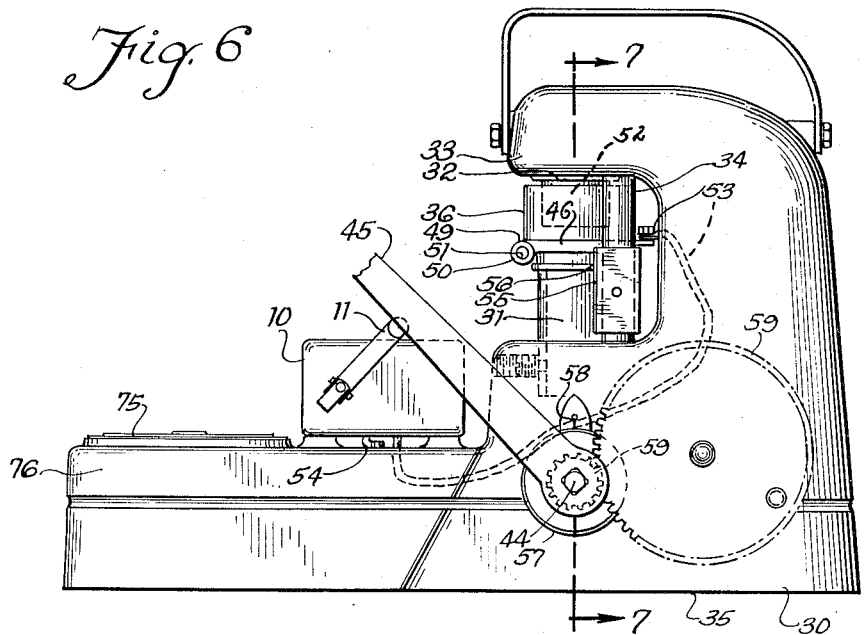
Fig. 6 is a side elevation thereof.

Describing the drawings in detail and first referring to Fig. 1, the numeral 10 indicates a resistance measuring instrument, the particular type of which depends on the particular range of moisture contents to be measured. The instrument shown, which is a commercially available one suitable for measurement of resistances in a range of about 3000 ohms to 250 megohms is a meter with a voltage generator driven by a manual crank 11, and an indicating meter with a dial needle 12. Preferably this resistance measuring instrument 10 is of the "true ohmeter" or permanent magnet and moving coil type, having the quality of maintaining a constant voltage output regardless of the loading of such output. The output of the instrument 10 is by circuit leads 13 connected across a pair of contact electrodes 14, 15 which have sample-contacting surfaces of an area preselected to ensure adequate contact with a sample, as that designated 16, for accurate measurement of resistance of the sample. Measurement is accomplished by rotating crank 11 and reading the position of the needle 12.

According to one aspect of the invention the sample 16 is to be regarded as having been subjected to a standardization procedure, that is to say, as having had its cross sectional area transverse to the direction of spacing of electrodes 14, 15 and its thickness in the direction of such spacing, so selected with respect to the basic particular relation between conductivity and moisture content of the particular material as to make definite resistance values of the sample, as determined by moisture content of the sample, correspond to a preselected scale of particular moisture content percentage values.

An arrangement is provided for accurate measurement of temperature of the sample during measurement of its resistance. To this end a highly thermal-conductive path is provided between sample 16 and the thermal input of a temperature instrument, here the bulb of a thermometer 17. Advantageously this is accomplished by enclosing the thermometer in a bulb-contacting casing 18 of highly heat-conductive material that is thermally closely coupled with the sample, as through one electrode, shown as 15, which also is made of high thermal conduction quality.

Use of the arrangement of Fig. 1 is made by taking simultaneous readings of the resistance of a standardized sample 16 from instrument needle 1, and a reading of temperature of the sample from thermometer 17. These readings respectively provide a value that can be interpreted as a moisture content percentage in accordance with corresponding values of the three correlated scales, as set forth above.

Fig. 3 discloses one form of scale device arrangement for interpreting, in terms of moisture content percentage, resistance and temperature of a sample that has been standardized in accordance with the principles set forth above. Such temperature and resistance values can be obtained by means of the system of Fig. 1, and by apparatus such as that to be described in connection with Figs. 2 and 4 to 9.

The interpreting device comprises three scales, which conveniently may be designated respectively as an "ohm scale" 20, a "moisture percentage scale" 21, and a "temperature scale" 22. Any two of these scales are relatively fixed and at least partly coextensive, while the remaining one, which is a compensating scale permitting interpretation of both temperature and resistance in terms of moisture percentage, is movable relative to the other two. In the arrangement shown the ohm and moisture percentage scales 20, 21 are relatively fixed, an arrangement regarded as preferable since normally those two scales are of equivalent lengths, while the temperature scale 22 is usually shorter. To selected points of the ohm scale are assigned selected resistance values within the measurement range of instrument 10. Thus any position of needle 12 has a corresponding point on scale 20. Preferably, for simplicity of use, scale 20 and the dial of instrument 10 are calibrated in corresponding legends other than numbers of ohms, as the series of numbers from "0" to "50" shown in the drawings.

The moisture percentage scale 21 is calibrated in terms of moisture content percentages. The distribution of the percentage values on scale 21 is correlated with the distribution of resistance values on scale 20. The correlation of specific moisture percentage values with specific numbers of ohms is made possible by the physical standardization of samples to make their particular resistance values correspond to particular moisture content percentages and temperatures. Specific standardizations for different materials vary, that is to say various relations between thickness and cross sectional areas of samples of materials not requiring compression, and different weights and degrees of compression of different particulate materials are selected to make the samples correspond to the selected scales of moisture content temperature and resistance values. An adequate method of learning the best standardizing procedure for a given material is by empirical laboratory experiment checked against an analytical laboratory moisture testing procedure that is regarded as standard for ascertaining moisture content percentages. The relation between degrees of compression of a selected sample weight and resistance of such a sample is always linear in a moisture content range of approximately eight to forty percent, but in ranges of higher and lower moisture contents becomes non-linear. In the linear range, variation in degree of compression changes the proportional relation between them, greater compression decreasing the resistance of samples of high moisture content much more than samples of lower moisture contents. In other words, in a graphic comparison of moisture contents indicated by resistance with those obtained by analytical methods, change in degree of compression changes the slope of a line plotting the comparative values. Variation in compression thus enables the moisture values indicated by the present method to conform with those indicated by the analytical methods. Changes in weight of the sample varies the range of resistance values accompanying variations in moisture contents. A very important feature of the invention is the characteristic permitting adjustment of the moisture content values that are obtained by practicing the invention to agree with a preselected scale of such values. In other words, the method of the invention permits an adjustment of ascertained moisture content values, rather than providing indications that are rigidly fixed by characteristics of the instrument.

The temperature scale 22 is movable relative to fixed scales 20, 21, and is laid off and calibrated in a unitary progression of numbers of degrees centigrade. The length of scale 22 and its divisions are so related to the distribution of particular resistance and moisture percentage values on scales 20, 21 that registration of the temperature scale mark representative of a measured sample temperature with the ohm scale mark that represents a measured sample resistance places an index mark 24 of the temperature scale in registration with the correct value on moisture percentage scale 21.

The illustrated physical arrangement of the interpreting device of Fig. 3 is not exclusive, but is convenient and practical. Ohm and moisture percentage scales 20, 21 are marked on a body plate 25, and are laid out on concentric arcs of different radii. Temperature scale 22 is marked on a plate 26 that is attached to body plate 25 for rotative movement that is concentric with scales 20, 21. Plate 26 extends radially past the inner of scales 20, 21, here ohm scale 20, a window 27 being provided for observing that scale, and scale 22 is marked on an arcuate part 28 of body 26 lying outward of window 27 and movable along a path between scales 20 and 21. The divisions of scale 22 extend to the inner edge of part 28 for registration with the marks of scale 20, and the index mark 24 extends to the outer edge of part 28 for registration with the marks of scale 21. Projections 29 may be struck from plate 26 to serve as finger grips for manipulating plate 26 to adjust scale 22.

The index mark 24 represents a selected temperature with respect to which standardizing procedures for samples of given materials are established, and with reference to which the ohm values and the corresponding percentage values are distributed on scales 20, 21. The temperature indicated by the drawings is zero centigrade.

The circular form of correlating device is convenient and it also lends itself to mounting on a moisture testing instrument in proximity to a thermometer as 17 of Fig. 1, and to a measuring instrument as 10 of Fig. 1.

Figs. 2 and 4 to 7 disclose one form of apparatus, for compressing samples of materials for standardizing them, and for measuring temperature and resistance of samples while so compressed. The device may be a press or jack capable of exerting the required pressure on the material undergoing test and arranged with means for very accurately controlling the thickness to which the material is compressed, provided with means for confining the body of the test sample to predetermined dimensions extending transverse to the direction of pressure application, and additionally provided with electrical means for measuring resistance of the compressed and confined sample. The device as shown, may comprise a main casting 30 that is massive to provide sufficient resistance to distortion by the heavy pressures that are necessary, to avoid inaccuracies of sample thickness control due to such distortion. The pressure-delivering means is shown as comprising a lower, vertically reciprocable ram member 31 and a stationary vertically disposed upper abutment member 32 axially aligned with the ram and rigidly secured against vertical movement by mounting of its upper end in an overhanging top part 33 of the heavy main casting. Vertical staybolts 34 may be placed adjacent the ram and member 32.

Seated on the top of the ram 31 is the sample-container, shown as a cylindrical, open-topped cup 36. The cup 36 comprises an outer strong metal shell including a surrounding side wall 37 and bottom wall 38, and a cylindrical liner 39 of insulating material open at both ends, and of an inside diameter to closely surround the abutment member 32 in surface to surface sliding contact. Obviously many cup structures other than that shown may be used. Additionally, and as suggested by Fig. 1, flat plates may be used instead of a cup in certain cases as when a solid is being tested.

Figure 7:
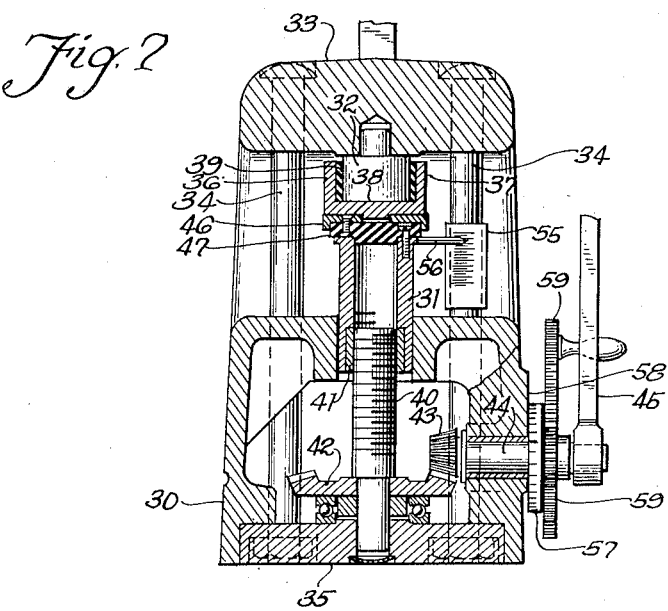
Fig. 7 is a sectional view on line 7—7 of Fig. 6.

The mechanism shown by Fig. 7 for raising and lowering the ram 31 comprises a threaded shaft 40 engaging an internally threaded bushing 41 rigidly secured within the tubular ram, the threaded shaft 40 having keyed to it a gear 42 driven by a pinion 43 secured to an operating shaft 44 that may be turned by a handle or lever 45 detachably mounted on its end.

Conveniently the cup 36 is removably supported on the ram 31 by an electrically and thermally conductive plate 46 that in turn rests on and is secured to a plate 47 of insulating material that electrically isolates the cup from the ram 31 to which it is secured. The cup advantageously is removable from the mounting and may have a handle 48. The plate 46 is provided with an extension 49 of high thermal conductivity and which is supplied with a casing 50 having a bore 51 for containing a thermometer 52.

One terminal of the resistance measuring instrument 10, is electrically connected to the bottom 38 of the sample-container 36, preferably by a wire 53 connected to conduction plate 46, and the other terminal is connected to the end surface of abutment member 32 advantageously by grounding to the machine casting at 54. The arrangement provides for ready measurement of the resistance of the compressed sample.

For purposes of accurate regulation of thickness to which the weighed and laterally confined test sample is compressed, the drawings disclose three general methods and a type of apparatus for performing each. The method of Figs. 2, 4 and 5 is scale-reading, and coarse and fine scales and operations are provided. The coarse system comprises a coarse scale 55 that is fixed to a rigid part of the machine, shown as one of the staybolts 34, adjacent the cup for cooperation with a pointer 56 carried by the ram to indicate on the scale the distance between the end surface of the abutment 32 and either the bottom surface of the sample chamber enclosed by the cup or the flat electrode 15 of Fig. 1. The fine system comprises a vernier dial 57 fixed on shaft 44, and bearing on its cylindrical edge surface a scale calibrated for cooperation with a pointer 58 secured to the casting, for indicating to a fine degree the changes in distance between the opposed surfaces of the sample support 15 or 38 and abutment member 32 occurring through a single rotation of shaft 44. A rotation-multiplying train of gears 59 provides for rapid rotation of shaft 44, for preliminary run-up of ram 31, handle 45 being removed during run-up operations. The handle 45 is used to apply the relatively great force that is usually required to compress samples to the necessary thicknesses. Preferably a ratchet couples handle 45 to shaft 44. The ratio between gears 42, 43 and the pitch of the threads interconnecting ram 31 and shaft 40 determine the calibration of the coarse and fine scales, and are so selected that the fine scale calibration permits control of the distance between the two surfaces, and consequently the thickness to which the sample is brought with sufficient accuracy for purposes of the invention, at least of the order of one thousandth of an inch.

In Fig. 8 a vernier screw arrangement for ram drive is shown. In this device a finely threaded vertical screw 60 may be either a screw that forces an upper ram downward into a vertically fixed sample cup, or it may be a screw that selects the level of the end surface of an abutment member, similar to that of Fig. 7, but that is vertically adjustable to select the space between its end and an opposed sample-supporting surface that is movable upward only to a definite level. In Fig. 8, screw 60 is moved vertically by an internally threaded gear 61 engaged with it, and that is meshed in driven engagement by a gear 62 carried by an adjusting drive shaft 63. A calibrated dial 64, preferably recessed into a casting 65 that supports the assembly so far described, is keyed to gear 61 to rotate with it, but to permit the screw to move vertically while the dial is vertically fixed. A pointer 66 mounted on the casting cooperates with the calibration of the dial. This vernier type arrangement is well known to permit control of the axially movable threaded shaft with accuracy of the order of a ten-thousandth of an inch, and is highly suitable for the present purpose.

Fig. 9 shows a form of stop device that may be used to fix the thickness to which the test sample is brought. While many forms of adjustable stop may be used, the one of Fig. 9 comprises simply a stop collar 67 that is adjustable axially of the upper compression member 68, which may be either a downwardly movable ram or a fixed abutment member. In the present case axial adjustment of the collar 67 is permitted by its threaded engagement with member 68, the collar being rotatable on the latter. Stop action is provided by contact of the lower surface of collar 67 with the uppermost surface of the cup structure 69. Any suitable indicating scale arrangement may be used to show the separation of the end 70 of member 68 and the sample supporting surface.

Figs. 2 and 4 to 6 disclose a combination of the resistance measuring instrument 10, the thermometer 52, and the interpreting device, of Fig. 3, affording convenient and simple moisture content measurement.

For mounting the resistance measuring instrument 10 and the interpreting device designated 75, as well as to give stability to the machine, the base part 35 is provided with an extension 76 projecting forward of the thermometer casing 50, which has a front-facing sight opening as shown through which the scale of thermometer 52 is visible. With instrument 10 and the interpreting scale device 75 mounted on the base extension 76, with the latter forward of the former and below the level of the thermometer, and with sample thickness scale 55 and that on dial 57 fully visible, and the operating handles of the jack mechanism and instrument 10 conveniently located to the right and forward of an operator facing the various dials and thermometer, an extremely convenient arrangement is afforded for adjusting the compressed thickness of the sample, reading the instrument dial and thermometer and effecting adjustment of the interpreting scale device.

Organic materials found by actual test and exhaustive checking to be capable of accurate moisture content ascertainment by the invention have included the following:

| | |
|---|---|
| Flax | Wheat |
| Rapeseed | Nuts |
| Cotton Seed | Plastic Resins |
| Sunflower Seed | Textiles (natural) |
| Peanuts | Plastic Laminates |
| Soya Beans | Pigments (paint and chemical) |
| Butter | |
| Cheese | Coal |
| Dehydrated Milk | Coal Tars |
| Dehydrated Fruits | Powdered Chemicals |
| Raisins | Wood Flour |
| Tobacco | Vegetables (fresh or frozen) |
| Raw Hides | |
| Leather | Potato Flour |
| Prepared Cereals | Wheat Flour |
| Oatmeal | Corn Meal |
| Sugar | Corn |
| Wood | Bran |
| Sawdust | Rice |
| Wood Shavings | Tapioca |
| Soap | Green Coffee |
| Lard | Roasted Coffee (Bean and Ground) |
| Raw Meats | |
| Frozen Meats | Insulites (Peat, etc.) |
| Raw Fish | Flax Seed |
| Frozen Fish | Hemp |
| Sausage | Rye |
| Baling Hay | Oats |
| Straw | Barley |
| Cotton | Sugar (Cane and Sugar Beet) |
| Wool | |
| Linen | Starch |
| Paper | Powdered Yeast |
| Paper Pulp | |

Inorganic materials similarly found to be susceptible to accurate testing by the invention have included the following:

| | |
|---|---|
| Mineral Wool | Cement Powder |
| Borax | Brick |
| Textiles (synthetic) | Clay |
| Molding Sand | |

As examples of sample weights of particular materials and thickness to which they are compressed, for example when confined to cylindrical form by a cup-like container having a cylindrical surrounding-wall and a flat bottom of two square inches in area, the following weights and optimum thicknesses were ascertained to bring the materials opposite which they appear to the condition in which the same values of their measured resistances correspond to the same moisture content percentages, and also cause the moisture percentages obtained by practicing the invention to correspond closely with those obtained from the same materials by the air oven evaporation method at present regarded as the standard of moisture content ascertainment.

| Material | Sample weight, grams | Testing thickness, inches |
|---|---|---|
| Barley (unpearled) (western) | 20 | .375 |
| Corn (domestic) | 20 | .450 |
| Corn (kiln dried) | 20 | .450 |
| Corn (ground) | 15 | .320 |
| Cottonseed (undelinted) | 10 | .400* |
| Cranberry beans (edible) | 20 | .430 |
| Flaxseed | 15 | .380* |
| Kidney beans (edible) | 20 | .400 |
| Lupine (blue) | 20 | .600 |
| Maize (milo) | 20 | .400 |
| Oats (eastern) | 15 | .420 |
| Popcorn (South American) | 20 | .450 |
| Rapeseed | 12 | .370 |
| Rice (southern production): | | |
| Rough rice | 20 | .525 |
| Milled rice | 20 | .450 |
| Brewers' rice | 20 | .450 |
| Rice screenings | 20 | .450 |
| Second heads | 20 | .450 |
| Brown rice | 20 | .370 |
| Rye | 10 | .220 |
| Soybeans | 20 | .500* |
| Soybean meal (solvent) | 15 | .350* |
| Soybean meal (expeller) | 15 | .425* |
| Vetch (hairy) | 20 | .575 |
| Wheat | 20 | .400 |
| Yellow eye beans (edible) | 20 | .460 |
| Yeast (powdered-live cell) | 10 | .200* |

The materials marked with asterisks are some that have contents of non-aqueous conductivity-affecting matter in sufficiently regular proportion to weight to permit compensation of indicated values by use of predetermined corrective factors, such as multiplication or subtraction factors.

In use of the temperature correction, it is to be noted that in normal use of the instrument, when the sample and thermometer enclosing structure are at nearly equal temperatures, the temperature of the relatively small sample mass will quickly change to that of the relatively massive structure enclosing it. In such condition the test, including reading of the thermometer and of the sample resistance can be made with accuracy as soon as final positioning of the electrodes is accomplished. When a marked difference exists in temperatures of the sample and machine, a period of time, not longer than five minutes, may be necessary to permit the sample temperature to change to that of the structure that actually is indicated by the thermometer. A very valuable and unique feature of the method and apparatus is its ability to measure hot and cold materials, as grain freshly removed from a drying kiln, or frozen organic materials. In the latter case, compression and a machine temperature above freezing usually may be relied upon to thaw the material. Also it is important to note that after kiln drying, which disturbs internal moisture distribution in some materials, such as corn, no equalization period is necessary before accurate tests are possible by practice of the invention.

The basis of layout of the correlated scales is provided by a basic scale of nine divisions. To the successive division points of the basic scale, ten in number including the beginning and end points, are assigned numbers of ohms increasing by powers of ten, 10 ohms being assigned to the beginning basic scale point, $10^2$ ohms to the second point, and so on, $10^{10}$ ohms being assigned to the scale end point. Such division points are designated 75 in Fig. 3. The length of the basic scale, that is to say the member of its divisions, to be used in the actual scale layout, depends on the resistance range within which the readings of the particular resistance-measuring instrument to be used accurately represent the sample moisture contents. Thus in the device of Fig. 3, for use with a resistance-measuring instrument having a range, useful for moisture content ascertainment, of 5000 ohms to 250 megohms, which can practically and accurately represent a range of moisture contents of the order of twenty-five to eleven percent, use is made of calibrated scales corresponding to the basic scale portion wherein the useful instrument range falls. In this example such basic scale range extends from the third to a point between the eighth and ninth division points. It results in assignment of approximately 5000 ohms to the beginning of the useful scale range, the point of the ohm scale 20 designated by the symbol "49" and 250 megohms to the opposite end of scale 20 designated "0." Since the length of scale 20 corresponds to the dial of the resistance-measuring instrument, for convenient calibration in use, both the instrument dial and scale 20 the maximum ohm value of the useful basic scale range, 250 megohms, is assigned the actual scale calibration symbol "0," and the minimum value, theoretically corresponding to zero resistance is assigned calibration symbol "50."

The moisture percentage scale 21 and temperature scale 22 are correlated with basic scale, and with the distribution of numbers of ohms along it resulting from the above-described assignment, in accordance with the following formula, the discovery of which as representative of the inter-relation between moisture content percentage, temperature and resistivity is an important aspect of the invention:

$$\frac{100}{\left[\left(\frac{\log \text{ ohms}}{4}\right) \pm \frac{T}{100}\right]4} = \frac{25}{\left(\frac{\log \text{ ohms}}{4}\right) \pm \frac{T}{100}} = \text{moisture content percentage}$$

wherein the expression "log Ohms" indicates the logarithm of the number of ohms of measured resistance of a standard sample, and the expression "T" represents the number of degrees centigrade of variance from zero centigrade of the sample temperature at the time of measuring its resistance. In accordance with the portion of this formula representing the relation between moisture content and resistivity:

$$\frac{100}{\log \text{ ohms}} \text{ or } \frac{25}{\frac{\log \text{ ohms}}{4}}$$

the moisture percentage scale 21 is calibrated at suitable scale points in terms of reciprocals of the logarithms of numbers of ohms falling at corresponding points of the basic scale as a result of the distribution of numbers of ohms described above, and these reciprocals express directly in terms of moisture content percentage the numbers of ohms distributed along the basic scale, and consequently the measuring instrument dial symbols applied to scale 20. In accordance with the above formula, these moisture content percentage values, or reciprocals of logarithms of numbers of ohms, may be made, by proper standardizing of samples of materials in the manners set forth above to correspond to particular resistances of such samples at zero centigrade.

Still further, in accordance with the portion of the above formula setting forth the effect of temperature on resistivity;

$$\frac{100}{\left(\pm \frac{T}{100}\right)4} \text{ or } \frac{25}{\pm \frac{T}{100}}$$

25 degrees of variance from zero centigrade occupies a length of scale 22 corresponding to one-ninth of the full basic scale length. Thus the 50 degree temperature scale shown in Fig. 3 is equal in length to two-ninths of the basic scale length.

As a specific example, it will be assumed that the resistance of a standardized sample is 100,000 or $10^5$ ohms, the logarithm of this ohmic number being 5. In Fig. 3, the resistance instrument reading obtained from the sample would be 40.6 which corresponds to the fifth division point 75 of the basic scale or to the logarithm, 5, of 100,000 ohms. Substituting these values in the formula, at an assumed sample temperature of zero centigrade, the formula becomes:

$$\frac{25}{\frac{5}{4}} = 20\%$$

and the moisture percentage scale value of "20," corresponds to the 100,000 ohms point, or fifth division point 75 of the basic scale as shown in Fig. 3. Twenty percent or .20 is the reciprocal of five.

If it now is assumed that the sample temperature is twenty-five degrees centigrade, the formula with substituted values becomes:

$$\frac{25}{\frac{5}{4} + \frac{25}{100}} = 16.6\%$$

In the correlator device of Fig. 3, which is shown set in accordance with the above example, the temperature scale 22 is set with the sample temperature reading (25 degrees) opposite the meter reading of 40.6, which corresponds to 100,000 ohms and the temperature scale index mark 24 registers with the moisture scale value of 16.6 percent.

In the arrangement shown, division points 75 are equally spaced. This results in the illustrated uneven distribution of moisture percentages. If desired the moisture percentages can be evenly or otherwise arbitrarily distributed. This results in an uneven distribution of the division points of the theoretical basic scale to which the powers of ten progression of numbers of ohms are assigned, but this fact is of no consequence in view of the arbitrary corresponding calibrations of the measuring instrument dial and scale 20. A temperature scale of twenty-five degrees still will have a length corresponding to one-ninth of the full basic scale, and will also still be calibrated in even divisions representative of equal temperature variations.

It will be seen that in addition to being a device for interpreting resistance and temperature readings in terms of moisture, the scale device may be considered as a device for indicating the effect of temperature on resistance.

From the foregoing the nature and advantages of the invention will be apparent, and it will be readily understood that changes may be resorted to without departing from the invention as defined by the appended claims.

I claim:

1. The method of ascertaining the moisture content percentage of a material comprising compressing a predetermined weight of the material to a predetermined thickness, applying a direct voltage across the said thickness of said material, and measuring the intensity of direct current flowing through said material while maintaining it compressed at the predetermined thickness.

2. The method of ascertaining the moisture content percentage of a material comprising compressing a predetermined weight of the material to a predetermined thickness and volume, and measuring the electrical resistance of the material while maintaining it compressed at the predetermined thickness and volume.

3. The method of ascertaining the moisture content percentage of a material comprising compressing a predetermined weight of the material to a predetermined thickness and volume, and simultaneously measuring the electrical resistance and temperature of the material while maintaining it compressed at the predetermined thickness and volume.

4. An instrument arrangement for simultaneously measuring electrical resistance and temperature of material while compressed in a cup having an electric and thermal conductive bottom and enclosing a chamber; said arrangement comprising a vertical compression member and a support and means for holding said cup in vertical alignment with said member, means for relatively moving said cup and compression member to enter and withdraw said member into and out of said chamber, an electrically and thermally conductive pad on said support and including structure providing a path of high thermal conductivity between said chamber and a temperature measuring instrument, and an electric resistance measuring circuit connected across said pad and compression member.

5. An instrument arrangement according to claim 4, comprising frame structure including a base on which said support is mounted, a standard extending upward from said base in the rear of said support, and wherein said path-providing structure extends forward of said support and is provided with a bore for receiving a thermometer and is provided with a sight opening for reading a thermometer enclosed by said bore.

6. Apparatus for testing moisture content of samples by compressing them in a cup and measuring their electrical resistances and temperatures, said apparatus comprising a base, a standard projecting upward from said base and spaced rearward from a front thereof, a cup support mounted on said base in front of said standard, a compression member supported above said cup support by said standard for entering the chamber of a cup on said support, mechanism for relatively moving said cup support and compression member vertically to accomplish such entry, a thermally and electrically conductive pad on said cup support and including structure providing a bore in transverse disposition relative to the instrument for receiving a thermometer and providing a sight opening in the forward side of said bore, forward facing scale means for indicating spacing of the end of said compression member from the bottom surface of the chamber of a cup mounted on said support, and an electrical resistance measuring instrument having a dial and mounted on said base in front of said cup support, with its dial visible from the front of the apparatus, said instrument having an electrical resistance measuring circuit connected across said pad and compression member.

7. Apparatus according to claim 6, and including a device for interpreting readings of a thermometer contained in said bore and of readings of said resistance measuring instrument in terms of moisture content percentage, said device being mounted on said base in front of said instrument and in front of and below said sight opening.

8. Apparatus for ascertaining moisture content of material by measurement of its resistance while in a compressed condition, comprising two bodies of electrically conductive material having a pair of plane and parallel surfaces and being relatively movable in directions extended axially of said surfaces for adjustment of the distance between the latter, means for relatively moving said bodies to reduce the distance between said surfaces thereby to compress between them a body of material to be tested, wall structure arranged to laterally confine a body of material during compression between said surfaces, means for accurately determining the distance between said surfaces, and electrical resistance-measuring means connected across said surfaces for measuring resistance of material compressed between them.

9. Apparatus for determining moisture content of material by measurement of its resistance while in a compressed condition, in accordance with claim 8; wherein the means for accurately determining distance between said surfaces comprises means for controlling the degree of their approaching relative movement, a scale rigidly connected to one said body and having an index indicating the location of its said surface, and a pointer rigidly connected with the other said body to indicate the location of its said surface and arranged for cooperation with said scale for indicating distance between said surfaces.

10. Apparatus for determining moisture content of material by measurement of its resistance while in a compressed condition, in accordance with claim 8; wherein the means for relatively moving the bodies is manually controllable, and a vernier operating device is arranged for accurately controllable operation of said means to select the distance of spacing to which said surfaces are brought by said means.

11. Apparatus for determining moisture content of material by measurement of its resistance while in a compressed condition, in accordance with claim 8; including means arranged to rigidly position one of said bodies to locate its said surface, a ram arranged to move the other said body, and mechanism arranged to advance said ram and including a rotatable operating element having connected therewith a vernier device arranged to indicate accurately the degree of movement of said surface of said other body.

12. Means for testing standardized samples of materials to ascertain their moisture content percentages by measuring their temperatures and resistances, comprising a pair of electrodes of substantial contact surface areas, one of which areas comprises the bottom of a cup that includes a sample-enclosing side wall extended from the contact surface of the latter said electrode, and the same said electrode being of highly thermal conductive material and including structure of said material extended past said side wall and enclosing a bore for a thermometer located beyond said side wall.

13. In an apparatus for determining the moisture content of materials, a container for receiving a predetermined quantity of said material, said container including an electrically conductive electrode structure formed of a material of high thermal conductivity, the mass of said electrode structure being substantially greater than the said predetermined quantity so that the electrode structure tends to bring the temperature of said material to that of said electrode structure, means extending outwardly from said electrode structure beyond the confines of said container and defining a bore extending transverse to said container, temperature determining means mounted in said bore in a heat transmitting relation with said structure for determining the temperature of said quantity of material, and means for establishing an electrical connection to said structure.

(References on following page)

References Cited in the file of this patent

UNITED STATES PATENTS

| | | | |
|---|---|---|---|
| 387,070 | Hart | July 3, | 1888 |
| 1,001,061 | Michaelson | Aug. 21, | 1911 |
| 1,214,040 | Jones | Jan. 30, | 1917 |
| 1,932,337 | Dowling | Oct. 24, | 1933 |
| 2,063,840 | Fairchild et al. | Dec. 8, | 1936 |
| 2,082,364 | Store | June 1, | 1937 |
| 2,251,641 | Stein | Aug. 5, | 1941 |
| 2,461,111 | Flinspach et al. | Feb. 8, | 1949 |
| 2,466,453 | Locke | Apr. 5, | 1949 |
| 2,469,736 | McBrayer | May 10, | 1949 |
| 2,520,394 | Franzen-Lutz et al. | Aug. 29, | 1950 |
| 2,542,928 | Kimball et al. | Feb. 20, | 1951 |
| 2,553,754 | Dietert et al. | May 22, | 1951 |
| 2,588,882 | Rolfson | Mar. 11, | 1952 |

FOREIGN PATENTS

| | | | |
|---|---|---|---|
| 592,450 | Great Britain | Sept. 18, | 1947 |